US012200186B2

United States Patent
Bai et al.

(10) Patent No.: US 12,200,186 B2
(45) Date of Patent: Jan. 14, 2025

(54) SYSTEM, METHOD AND SOFTWARE FOR ONLINE CAMERA CALIBRATION IN VEHICLES BASED ON VANISHING POINT AND POSE GRAPH

(71) Applicant: Guangzhou Xiaopeng Autopilot Technology Co., Ltd., Guangzhou (CN)

(72) Inventors: Chen Bai, Guangzhou (CN); Cheng Lu, Guangzhou (CN); Chengzhang Zhong, Guangzhou (CN)

(73) Assignee: Guangzhou Xiaopeng Autopilot Technology Co., Ltd., Guangzhou (CN)

( * ) Notice: Subject to any disclaimer, the term of this patent is extended or adjusted under 35 U.S.C. 154(b) by 287 days.

(21) Appl. No.: 17/936,092

(22) Filed: Sep. 28, 2022

(65) Prior Publication Data

US 2024/0107001 A1    Mar. 28, 2024

(51) Int. Cl.
H04N 17/00 (2006.01)
B60W 50/06 (2006.01)
G06T 7/80 (2017.01)
H04N 23/90 (2023.01)

(52) U.S. Cl.
CPC .......... *H04N 17/002* (2013.01); *B60W 50/06* (2013.01); *G06T 7/80* (2017.01); *H04N 23/90* (2023.01); *B60W 2420/403* (2013.01); *B60W 2520/14* (2013.01); *B60W 2520/16* (2013.01); *B60W 2520/28* (2013.01); *G06T 2207/30244* (2013.01); *G06T 2207/30256* (2013.01)

(58) Field of Classification Search
CPC ........ H04N 17/002; H04N 23/90; G06T 7/80; G06T 2207/30244; G06T 2207/30256; B60W 50/06; B60W 2420/403; B60W 2520/14; B60W 2520/16; B60W 2520/28
USPC ......................................................... 701/523
See application file for complete search history.

(56) References Cited

U.S. PATENT DOCUMENTS

| 2019/0250631 A1* | 8/2019 | Nariyambut Murali ..................... G06T 7/246 |
| 2019/0258251 A1* | 8/2019 | Ditty .................... G05D 1/0274 |
| 2020/0276939 A1* | 9/2020 | Gupta ..................... B60R 11/04 |
| 2022/0076441 A1* | 3/2022 | Chakravarty ............. G06T 7/33 |

(Continued)

FOREIGN PATENT DOCUMENTS

| CN | 112146682 A | * 12/2020 | ........... G01C 25/005 |
| CN | 112183512 A | * 1/2021 | ......... G06K 9/00798 |

*Primary Examiner* — Hunter B Lonsberry
*Assistant Examiner* — Helen Li
(74) *Attorney, Agent, or Firm* — Getech Law LLC; Jun Ye

(57) ABSTRACT

Aspects of online camera calibration for autonomous driving systems are described herein. The aspects may include a wheel odometer configured to measure a current speed of a moving vehicle, a speed monitor configured to determine that the current speed of the moving vehicle is high or low, and a camera calibrator configured to calibrate, while the vehicle is moving, at least one front camera of the moving vehicle according to a position of a vanishing point of two lane lines when the current speed is high. When the current speed is low and the vehicle is still moving, the camera calibrator may be further configured to calibrate multiple side and rear cameras of the moving vehicle according to a pose graph that includes relative poses of the multiple side and rear cameras.

18 Claims, 7 Drawing Sheets

(56) References Cited

U.S. PATENT DOCUMENTS

2022/0179038 A1* 6/2022 Huffman .................. G01S 5/16
2022/0324438 A1* 10/2022 Liu ...................... B60W 50/14

* cited by examiner

PAIRWISE RELATIVE POSE ESTIMATION

SYSTEM, METHOD AND SOFTWARE FOR ONLINE CAMERA CALIBRATION IN VEHICLES BASED ON VANISHING POINT AND POSE GRAPH

TECHNICAL FIELD

The present disclosure generally relates to the technical field of autonomous driving, and specifically, relates to an apparatus and method for online calibrating cameras of autonomous driving systems.

BACKGROUND

The development of a vision-based autonomous driving system has been critical to providing safety for driving vehicles. The system may require information about camera location and orientation relative to the vehicle coordinates. Typical applications involve mapping lane lines into a bird-eye view to achieve goals like keeping the vehicle in the lane, estimating distances of detected moving objects, stitching a surround view image from front-view, side-view and rear view cameras, etc. As the location of camera to vehicle is usually originally fixed but minor drifts may occur during later operation, the calibration of camera orientation is crucial for driver assistance systems.

Traditional method of vehicle camera calibration can be performed with assistance from controlled visual targets and tools in a controlled environment, namely, offline calibration. This is typically used in either factory production line or service station where a well-controlled environment with professional equipment such as photographed patterns, vehicle centering platform, lighting control device, etc. can be set up.

Offline calibration has several limitations. First, it is inconvenient because the equipment placement and size are regulated by the camera location, resolution, and field of view. Second, the cost of station setup is high, and it often requires intensive human labor to assist the process.

There are some circumstances that the vehicle cameras are off their calibrated orientation and therefore need an immediate re-calibration. One possible case is that the cameras are off its original position after service, repairing, or replacement at service station. Another possible case is the drift of the cameras over time due to vibrations, mounting, or deformations in the vehicle body after driving a certain amount of time. The first case can be handled by offline calibration by setting up a camera calibration room at the high cost of equipment and human labor. The second case, however, has no solution and leaves the risk in driver assistance perception due to using inaccurate camera orientation to monitor neighboring environments. Online calibration, in contrast, provides a solution that completes the whole calibration in an uncontrolled environment without help from any targets and tools. It not only saves great amount of cost for the first case, but also automatically monitors and completes the calibration for the second case by driving on the road for a certain amount of time. Online solution has no cost but driving and has no human participation that every car owners do it without even feelings.

Some existing online calibration methods have several limitations when applied to a complete vehicle camera system that consists of front, side and rear cameras to cover a surround field of view for vehicle perception. Odometry-based methods require high accuracy of the location of other sensors and their measurements, and often contain accumulated error due to bias or measurement inaccuracy. From the perspective of vehicle setup, if using Lidar as the anchor for camera calibration, it limits its application in vehicles without such sensor. Pure-vision based methods often are not general solutions for a complete camera system, they either calibrate one front camera or calibrate surround cameras with prior camera setup of one or two cameras.

To overcome these limitations from prior disclosed patents and literature, the combination of vehicle sensor measurements and camera perception system is important. Instead of relying mostly on odometry sensor measurements, these measures can be utilized as supplemental signals for vision solutions to avoid accuracy issues. Vision measurements, including lane line and object detection, can be easily obtained from camera perception system of a vehicle with driving assistance package. Therefore, the online calibration system can be tightened to the whole driving system instead of being an independent system that occupies a large amount of resources.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example method for calibrating cameras on an autonomous driving system. The example method may include receiving a current speed of a moving vehicle from a wheel odometer; determining that the current speed of the moving vehicle is greater than a first predetermined speed threshold; calibrating, based on the determination that the current speed is greater than the predetermined speed threshold, at least one front camera of the moving vehicle according to a position of a vanishing point of two lane lines; determining that the current speed of the moving vehicle is less than a second predetermined speed threshold and is greater than zero; and calibrating, based on the determination that the current speed is less than the predetermined speed threshold and is greater than zero, multiple side and rear cameras of the moving vehicle according to a pose graph that includes relative poses of the multiple side and rear cameras.

Another example aspect of the present disclosure provides a system for calibrating cameras on an autonomous driving system. The example system may include a wheel odometer configured to measure a current speed of a moving vehicle; a speed monitor configured to determine that the current speed of the moving vehicle is greater than a first predetermined speed threshold; and a camera calibrator configured to calibrate, based on the determination that the current speed is greater than the predetermined speed threshold, at least one front camera of the moving vehicle according to a position of a vanishing point of two lane lines. The speed monitor is further configured to determine that the current speed of the moving vehicle is less than a second predetermined speed threshold and is greater than zero. The camera calibrator is further configured to calibrate, based on the determination that the current speed is less than the predetermined speed threshold and is greater than zero, multiple side and rear cameras of the moving vehicle according to a pose graph that includes relative poses of the multiple side and rear cameras.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described.

Besides, identical reference numbers refer to identical function and operation throughout the accompanying drawings.

An online calibration system for a moving vehicle is described herein to calibrate yaw and pitch orientations of multiple (e.g., 7) cameras with overlapping field-of-view covering 360 degree monitoring. In some examples, two of the multiple cameras are mounted on the moving vehicle facing the front, four cameras are mounted on the side, and one camera on the rear.

Calibration for the front two cameras may be based on a calculated vanishing point. The vanishing point is estimated by calculating an intersection of lane lines detected by deep learning models from a built-in camera perception system of the autonomous driving system.

Calibration for the side and rear cameras may be based on a pose graph optimization algorithm. A pose graph may be built by set camera absolute orientation as vertices and relative orientation between two cameras as edges. The relative orientation is estimated with feature detection and matching. The pose graph is optimized accordingly with the front cameras fixed to balance the errors among all edges.

Figure 1:
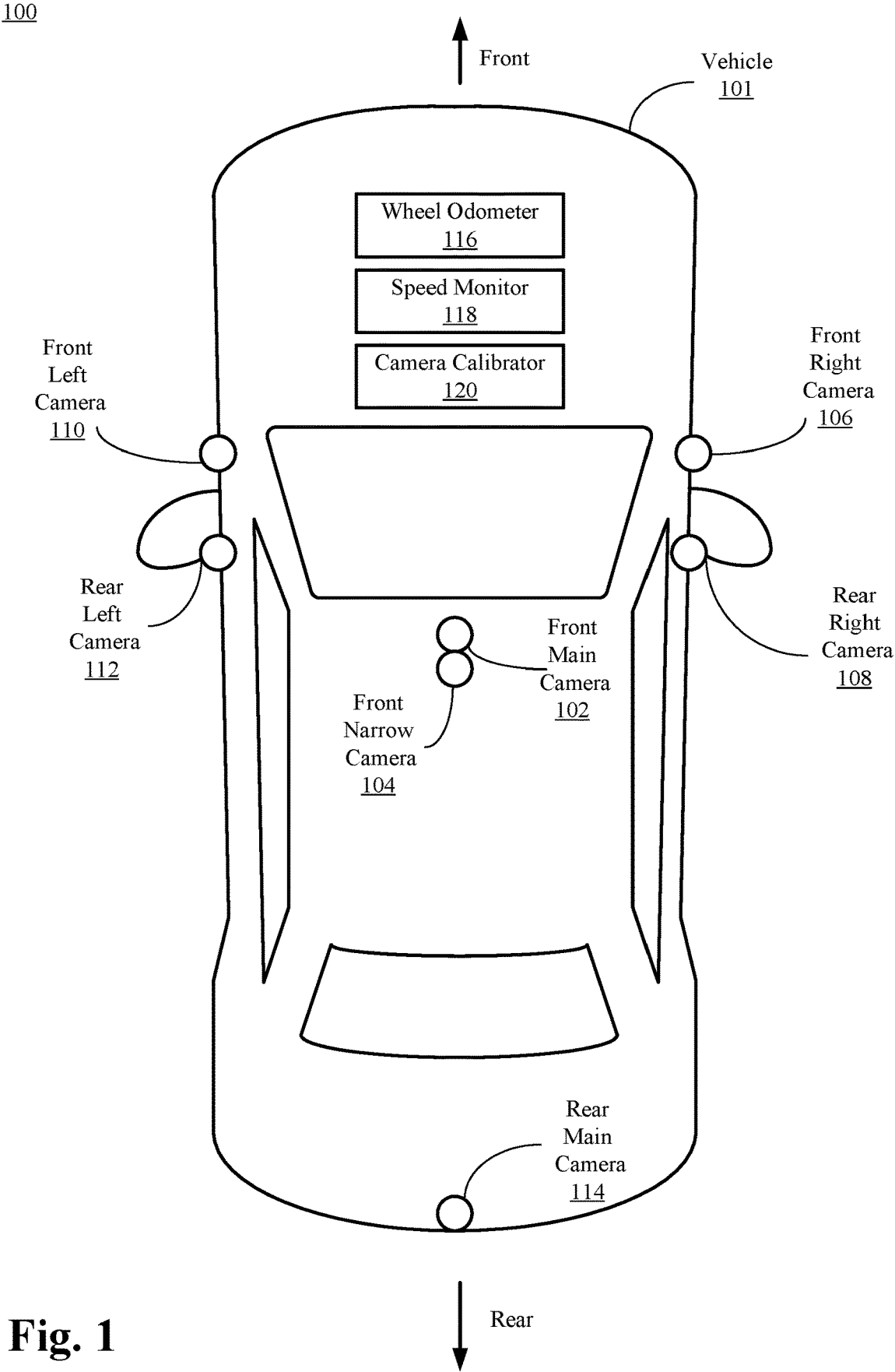
FIG. 1 illustrates a diagram showing an example autonomous driving system equipped with multiple cameras in accordance with the disclosure.

FIG. 1 illustrates a diagram showing an example autonomous driving system 100 equipped with multiple cameras in accordance with the disclosure. As depicted, the example autonomous driving system 100 may be implemented on a land vehicle 101.

The example autonomous driving system 100 may include multiple cameras mounted on different locations of the vehicle 101. As described above, the orientations of the cameras may drift due to vibrations, mounting, deformation in the vehicle body. Such drift may occur in three different principal axes or directions, i.e., yaw, pitch, and roll. Contrary to conventional "offline" camera calibration, the present disclosure provides systems and methods for calibrating the cameras while the vehicle is moving. It is noted that the term "online" refers to systems including working components in communication with each other on a traveling vehicle and updating configuration including camera orientations, rather than requiring the support of Internet. In some examples, the term "online" may be used interchangeably with "on-the-fly."

In some examples, the multiple cameras are mounted facing different directions from the perspective of the vehicle 101 and may cover different field-of-view (FOV). For example, a front main camera 102 and a front narrow camera 104 (collectively, "the front cameras") may be both mounted on top of the vehicle 101 facing front. The FOV of the front main camera 102 is typically wider than the FOV of the front narrow camera 104.

Other cameras may be mounted on the side and rear of the vehicle 101 (collectively, "side and rear cameras"). For example, a front right camera 106 facing front right and a rear right camera 108 facing rear right may be mounted the right side of the vehicle 101. A front left camera 110 facing front left and a rear left camera 112 facing rear left may be mounted on the left side of the vehicle 101. A rear main camera 114 facing rear may be mounted on the rear part of the vehicle 101.

The overlapping FOV between two adjacent cameras may be manually adjusted and set to a predetermined degree. For example, the overlapping FOV between the front main camera 102 and the front left camera 110 or the front right camera 106 may be around 28 degrees. The overlapping FOV between the front right camera 106 and the rear right camera 108 may be the same as the overlapping FOV between the front left camera 110 and the rear left camera 112. Both may be set to around 28 degrees. The overlapping FOV between the rear main camera 114 and the rear left camera 112 or the rear right camera 108 may be around 36 degrees.

The example autonomous driving system 100 may further include a wheel odometer 116 configured to measure a current speed of the vehicle 101. As described in greater detail below, the online calibration in accordance with the present disclosure may include two parts of calibration, i.e., calibrating the front cameras when the vehicle 101 travels at a high speed and calibrating the side and rear cameras when the vehicle 101 travels at a low speed. Thus, example autonomous driving system 100 may further include a speed monitor 118 configured to determine whether the measured current speed is "high" or "low" according to predetermined speed thresholds. For example, when the current speed is greater than 50 km per hour, the current speed may be determined as "high" and when the current speed is less than 30 km per hour, the speed may be determined as "low." The result of the speed determination may be sent to a camera calibrator 120 to trigger the calibration process.

Figure 2:
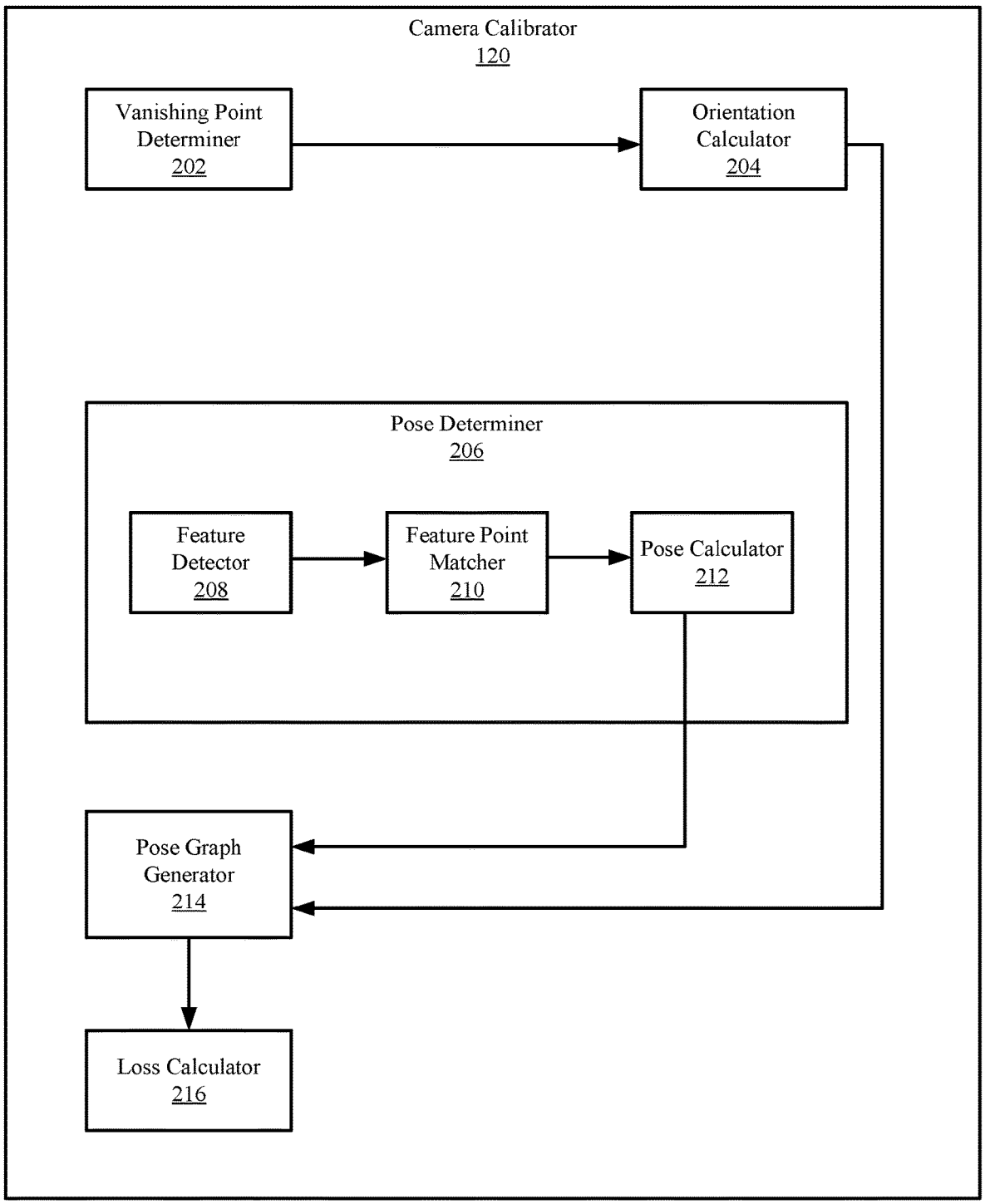
FIG. 2 illustrates a diagram showing an example camera calibrator for calibrating the multiple cameras of the example autonomous driving system in accordance with the disclosure.

FIG. 2 illustrates a diagram showing an example camera calibrator 120 for calibrating the multiple cameras of the example autonomous driving system in accordance with the disclosure.

In the case where the speed monitor 118 determines that the current speed of the vehicle 101 is high, the camera calibrator 120 may be configured to start the calibration process for the front cameras first.

In some examples, the camera calibrator 120 may first check if one or more additional conditions are met prior to the calibration process to ensure the environment surrounding the vehicle 101 is suitable for the calibration process. For example, the camera calibrator 120 may check signals transmitted from other modules of the vehicle 101 via controller area network (CAN) service. The camera calibrator 120 may check the signal from a wiper indicator to determine if the wipers are working, which may indicate whether it is raining. The camera calibrator 120 may check the signal from an angular rater monitor to determine if the angular rate is less than one degree per second, which may indicate whether the vehicle 101 is turning.

Further, the example autonomous driving system 100 may also include a visual perception system configured to detect lane lines and surrounding objects based on deep learning or artificial intelligence algorithms. Results of the detection may be sent to the camera calibrator 120. The camera calibrator 120 may be configured to determine whether the lane lines are straight and whether the vehicle 101 is traveling forward in the middle of the lane lines, e.g., polynomial fitting second order coefficient <α.

In some examples where the additional conditions are determined to be met, i.e., no rain, traveling forward, lane lines are straight, a vanishing point determiner 202 of the camera calibrator 120 may be configured to calculate a convergence of the two lane lines and determine the convergence as the vanishing point of the two lane lines. As the vehicle 101 is moving, the vanishing point determiner 202 may be configured to periodically calculate multiple vanishing points. Once a count of the multiple vanishing points reaches a preset threshold, the multiple vanishing points may be sent to an orientation calculator 204.

The orientation calculator 204 may be configured to determine an offset between a predetermined principal point and the vanishing point and further determine a yaw orientation and a pitch orientation based on the offset. The yaw and pitch orientations may indicate the amount of the drift of the corresponding camera. The example autonomous driving system 100 may be configured to utilize new camera orientation parameters in autonomous driving algorithms accordingly to compensate for the drift.

Figure 3:
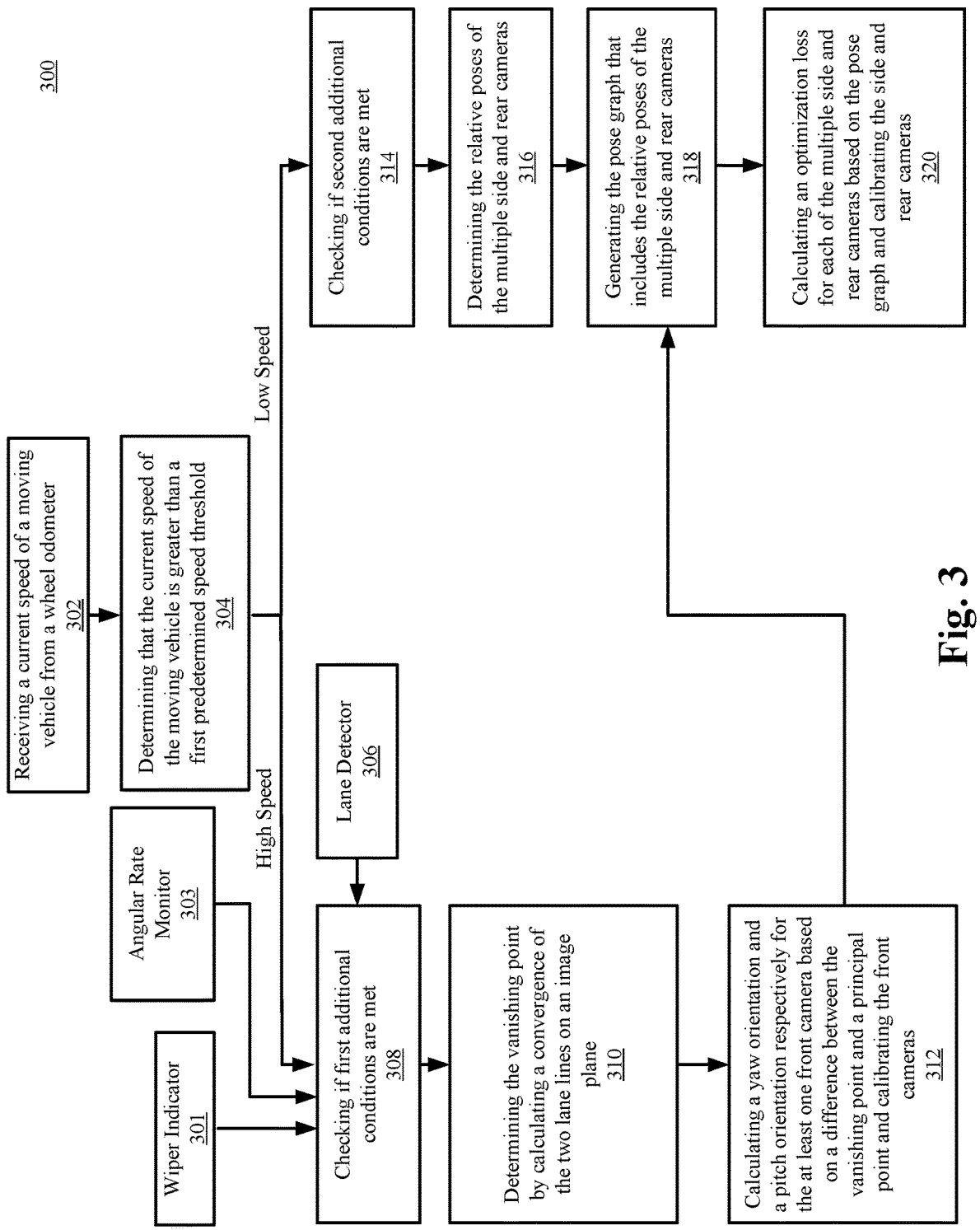
FIG. 3 illustrates a flow chart showing an example method for calibrating cameras on the example autonomous driving system in accordance with the disclosure.
Figure 4:
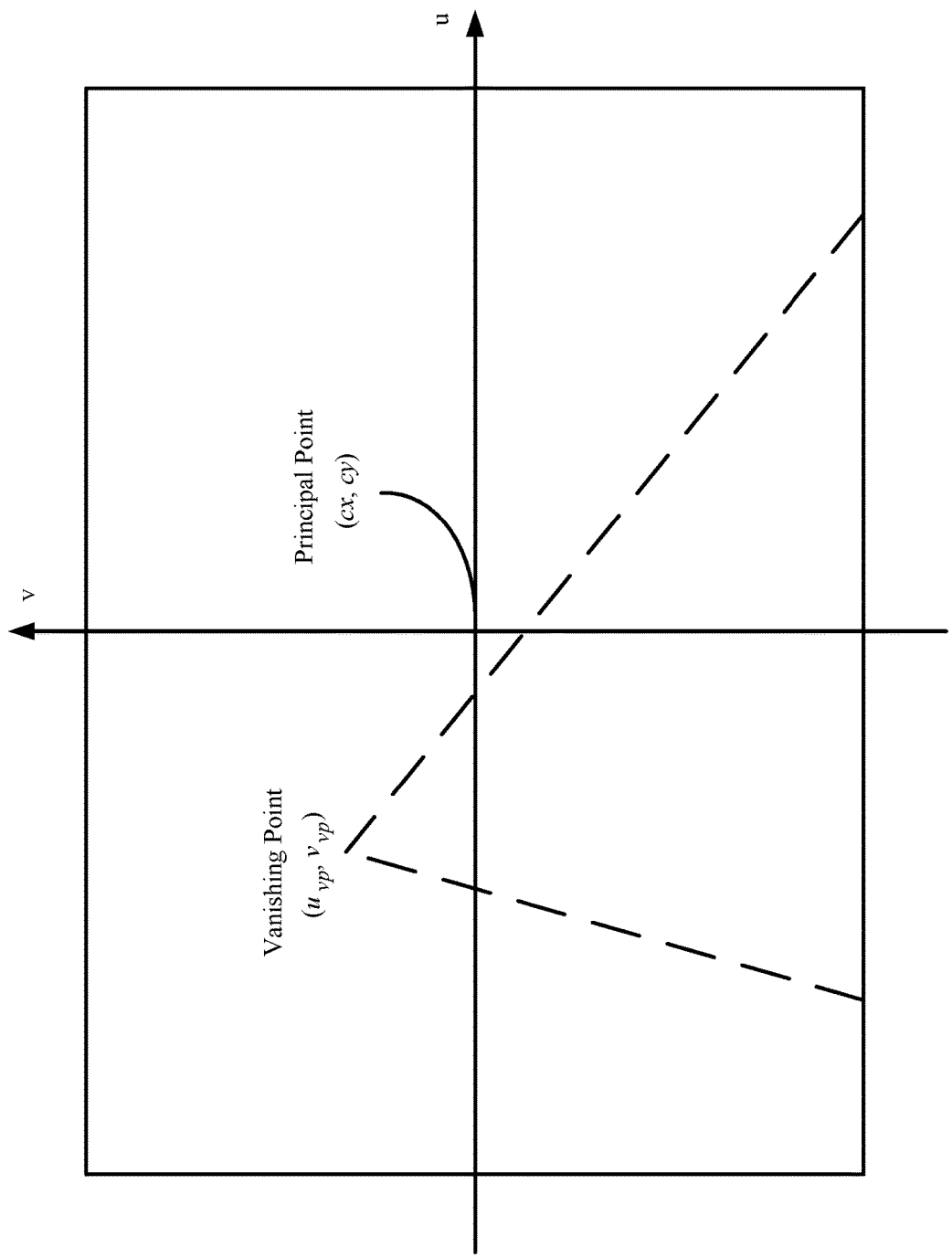
FIG. 4 illustrates a diagram showing an example vanishing point in accordance with the disclosure.

The calculation of the vanishing point and the yaw and pitch orientations is described in more detail in accordance with FIG. 4. As shown in FIG. 3, the yaw and pitch orientations may be sent to a pose graph generator 214 for further processing.

In the case where the speed monitor 118 determines that the current speed of the vehicle 101 is low, the camera calibrator 120 may be configured to start the calibration process for the side and rear cameras subsequent to the calibration of the front cameras if a group of additional conditions are met. The camera calibrator 120 may be configured to check the signal from a wiper indicator to determine if the wipers are working, which may indicate whether it is raining. The camera calibrator 120 may check the signal from an angular rater monitor to determine if the angular rate is less than one degree per second. The camera calibrator 120 may further check the status of low/high/fog beam and the lux of the environment to determine the environmental light is sufficient.

For example, a pose determiner 206 of the camera calibrator 120 may be configured to determine the relative poses of the multiple side and rear cameras. The relative poses of the multiple side and rear cameras may refer to the poses of each camera relative to a reference camera. The reference camera may be one of two adjacent cameras having a connecting edge in the pose graph.

In more detail, the pose determiner 206 may further include a feature detector 208 configured to detect features of surrounding static objects in images captured by the side and rear cameras. A feature point matcher 210 of the pose determiner 206 may be configured to match feature points of a same static object in different images based on ranked similarities. A pose calculator 212 of the pose determiner 206 may then be configured to determine the relative poses.

Based on the relative poses of the multiple side and rear cameras and the yaw and pitch orientations of the front cameras, the pose graph generator 214 may be configured to generate a pose graph with one of the front cameras being set as a reference or an anchor point. A loss calculator 216 may be configured to calculate an optimization loss for each of the side and rear cameras based on the pose graph. The optimization loss may refer to the orientations that indicate the drifts of the side and rear cameras. Similarly, the example autonomous driving system 100 may be configured to adjust parameters in the autonomous driving algorithms accordingly to compensate for the drifts.

FIG. 3 illustrates a flow chart showing an example method 300 for calibrating cameras on the example autonomous driving system in accordance with the disclosure. The process of performing example method 300 may start from block 302.

At block 302, the operations of method 300 may include receiving a current speed of a moving vehicle from a wheel odometer. For example, the speed monitor 118 may be configured to receive a current speed of vehicle 101 from the wheel odometer 116.

At block 304, the operations of method 300 may include determining that the current speed of the moving vehicle is greater than a first predetermined speed threshold or is less than a second predetermined speed threshold. If the result of the determination of the current speed is greater than the first predetermined speed threshold, the process of the method 300 may continue to block 308. If the result of the determination of the current speed is less than the second predetermined speed threshold but still greater than zero, the process of the method 300 may continue to block 314.

At block 308, the operations of method 300 may include checking if a group of first additional conditions are met based on signals fed from a wiper indicator 301, an angular rate monitor 303, and a lane detector 306 via CAN service. In some examples, the camera calibrator 120 may be configured to determine whether it is raining based on the signals from the wiper indicator 301, whether the vehicle 101 is turning based on the signals from the angular rate monitor 303, and whether the lane lines are straight based on the output from the lane detector 306 in the visual perception system.

At block 310, the operations of method 300 may include determining the vanishing point by calculating a convergence of the two lane lines on an image plane. For example, the vanishing point determiner 202 of the camera calibrator 120 may be configured to calculate a convergence of the two lane lines and determine the convergence as the vanishing point of the two lane lines. As the vehicle 101 is moving, the vanishing point determiner 202 may be configured to periodically calculate multiple vanishing points. Once a count of the multiple vanishing points reaches a preset threshold, the multiple vanishing points may be sent to the orientation calculator 204.

At block 312, the operations of method 300 may include calculating a yaw orientation and a pitch orientation respectively for the at least one front camera based on a difference between the vanishing point and a principal point and calibrating the front cameras. For example, the orientation calculator 204 may be configured to determine an offset between a predetermined principal point and the vanishing point and further determine a yaw orientation and a pitch orientation based on the offset. The process of method 300 may continue to block 314.

At block 314, the operations of method 300 may include determining a group of second additional conditions are met. For example, the camera calibrator 120 may be configured to check the signal from a wiper indicator to determine if the wipers are working and if it is raining. The camera calibrator 120 may check the signal from an angular rater monitor to determine if the angular rate is less than one degree per second. The camera calibrator 120 may further check the status of low/high/fog beam and the lux of the environment to determine the environmental light is sufficient.

At block 316, the operations of method 300 may include determining the relative poses of the multiple side and rear cameras. For example, a pose determiner 206 of the camera calibrator 120 may be configured to determine the relative poses of the multiple side and rear cameras.

At block 318, the operations of method 300 may include generating the pose graph that includes the relative poses of the multiple side and rear cameras. For example, based on the relative poses of the multiple side and rear cameras and the yaw and pitch orientations of the front cameras, the pose graph generator 214 may be configured to generate a pose graph with one of the front cameras being set as a reference or an anchor point.

At block 320, the operations of method 300 may include calculating an optimization loss for each of the multiple side and rear cameras based on the pose graph. For example, the loss calculator 216 may be configured to calculate an optimization loss for each of the side and rear cameras based on the pose graph.

FIG. 4 illustrates a diagram showing an example vanishing point in accordance with the disclosure.

In general, given a 3D point in the real-world, the corresponding 2D image point can be expressed as: $x_{2d}=K[R|T] X_{3d}$, where K is an intrinsic matrix of the camera that captured the 2D image, R and T respectively refer to the 3D rotation and translation. In the present disclosure, the vanishing point may be defined as a point on the image plane representing the converge of 2D perspective projections of mutually parallel lines in 3D space. Specifically, the vanishing point is an infinity point independent of translation T in the 3D coordinate. Thus, the vanishing point on a 2D image can be expressed as:

$$VP_{2d}=KR \cdot VP_{3d}$$

where $VP_{2d}$ refers to the position of the vanishing point in the 2D image and $VP_{3d}$ refers to the 3D coordinate of the vanishing point. The vanishing point may correspond to the yaw and pitch orientation of the front camera. To estimate the vanishing point, we take the assumption that when the vehicle is moving straight in the center of two lanes, the two ego lane lines can be considered to be parallel to its moving direction.

Considering the image plane with the principal point (cx, cy), and estimated vanishing point (x, y). The principal point is typically provided in camera intrinsic information and is determined when a camera is produced. As shown in FIG. 4, the vanishing point in plane offset by the principal point may be expressed as: $(u_{vp}, v_{vp})=(x_{vp}, y_{vp})-(cx, cy)$, The yaw and pitch orientation can be computed as: $u_{vp}=f_x \tan(yaw)$ and $v_{vp}=-f_y \tan(pitch)$ respectively.

Figure 5:
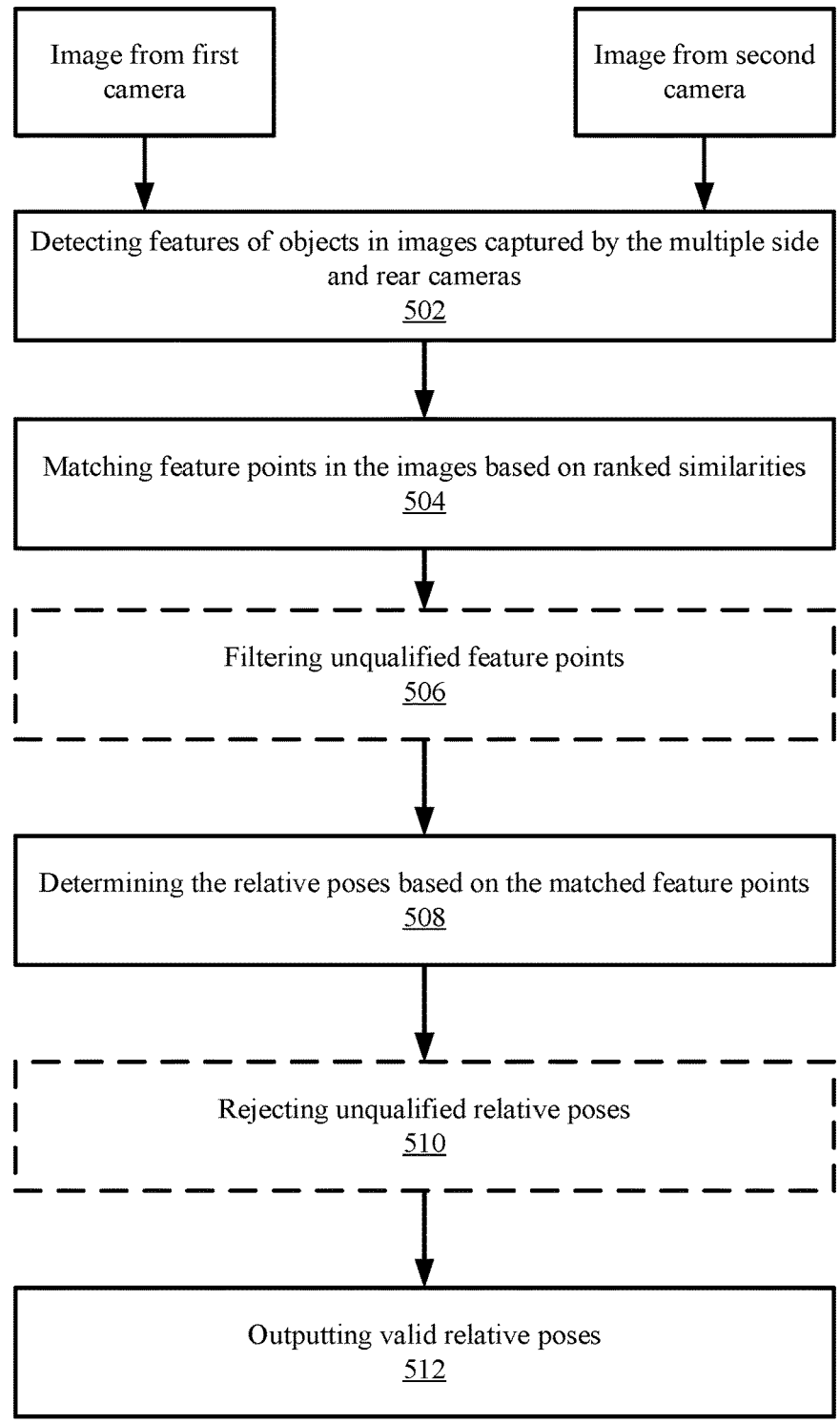
FIG. 5 illustrate a flow chart showing an example method for determining relative poses of multiple side and rear cameras in accordance with the disclosure.

FIG. 5 illustrate a flow chart showing an example method 500 for determining relative poses of multiple side and rear cameras in accordance with the disclosure.

As a part of calibrating the side and rear cameras, the process of determining or estimating relative poses of the side and rear cameras may be performed based the overlapping FOV between two adjacent cameras, for example, the overlapping FOV between the front main camera 102 and the front right camera 106. Images captured by the two adjacent cameras may be provided at the beginning of the process of method 500 for determining the relative poses. Dash-lined blocks may indicate optional operations of method 500.

At block 502, the operations of method 500 may include detecting features of objects in images captured by the multiple side and rear cameras. For example, the feature detector 208 may be configured to detect the features of surrounding static objects in accordance with some existing algorithm, e.g., a scale-invariant feature transform (SIFT) algorithm. As feature points of moving objects may cause errors in later feature matching process, the feature points of moving objects may be removed. The moving objects in the images may then be marked with bounding boxes. In other words, features points in the bounding boxes may not be considered in later process.

At block 504, the operations of method 500 may include matching feature points in the images based on ranked similarities. For example, the feature point matcher 210 may be configured to match the feature points in different images captured by the two adjacent cameras and rank the feature points based on the similarities of the feature points. The ranking may be performed by the feature point matcher 210 in accordance with a k-nearest-neighbor (KNN) algorithm.

In some examples, the feature point matcher 210 may be further configured to filter and discard unqualified feature points. The filtering may include one or more phases, e.g., distance filtering, symmetric filtering, and nominal extrinsic filtering. In distance filtering, the feature point matcher 210 may be configured to discard two similar points that are too close. In symmetric filtering, the feature point matcher 210 may be configured to discard feature points that only can be projected from one image to the other, but not vice versa. In nominal extrinsic filtering, the feature point matcher 210 may be configured to discard feature points based on point correspondences between two cameras that are constrained by initial camera setup including camera translation relative to vehicle and camera ideal installation orientation angles. Feature points that meet the criteria will be kept. The criteria can be formulated as $x_1^T t \times R x_2 < \delta$, where $x_1$ and $x_2$ are normalized corresponding points from two images captured by two adjacent cameras, t and R are the ideal installation translation and rotation, and $\delta$ is a predetermined threshold value.

At block 508, the operations of method 500 may include determining relative poses based on the matched feature points. For example, the pose calculator 212 may be configured to estimate or determine the relative pose of each camera taking an adjacent camera as a reference point. In more detail, the pose calculator 212 may be configured to calculate an essential matrix between the two adjacent cameras and decompose the essential matrix into a rotation and a translation matrix as the relative pose.

At block 510, the operations of method 500 may include rejecting unqualified relative poses. For example, when the relative poses appear to be the result of reprojection error and depth distribution, the relative poses may be discarded and rejected as invalid by the pose calculator 212. A reprojection error may refer to a geometric error when projecting a point from one image to another image using estimated relative pose. The average error of all matching points should be smaller than a predetermined threshold. Otherwise, this estimated relative pose may be rejected. Further, each point depth (distance) can be calculated based on estimated relative pose. The standard deviation of the depth distribution formed by all matching points should be larger than a predefined threshold. Otherwise, this estimated relative pose is rejected.

At block 512, the operations of method 500 may include outputting valid relative poses. For example, the pose calculator 212 may be configured to output the valid relative poses to the pose graph generator 214.

Figure 6:
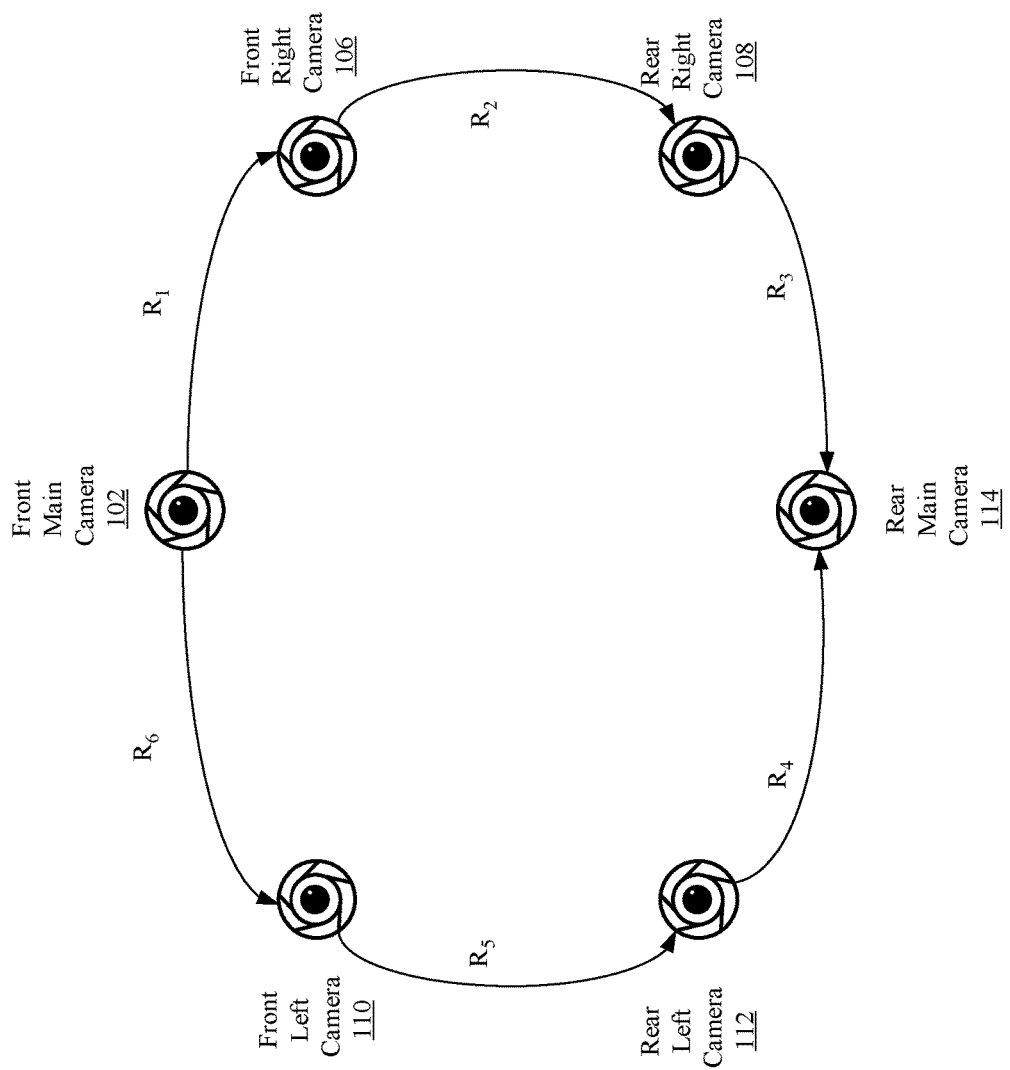
FIG. 6 illustrates a diagram showing an example process for determining optimization losses of the multiple side and rear cameras in accordance with the disclosure.

FIG. 6 illustrates a diagram showing an example process for determining optimization losses of the multiple side and rear cameras in accordance with the disclosure.

In some examples, the loss calculator 216 may be configured to generate a pose graph with each of the six cameras being vertices and the relative poses (e.g., $R_1$ to $R_6$ as shown) between any two adjacent cameras being edges. Adjacent cameras may refer to a pair of cameras that are connected by an edge on the pose graph (e.g., the front right camera 106 and the rear right camera 108). Since the front main camera 102 has been calibrated prior to other side and rear cameras, the front main camera 102 may be set as the anchor point. The graph optimization loss can be formulated to minimize the discrepancy for the each of the side and rear cameras as follows:

$$loss_{rear\_main} = R_{front\_main} R_1 R_2 R_3 - R_{front\_main} R_6 R_5 R_4$$

$$loss_{front\_right} = R_{front\_main} R_1 - R_{front\_main} R_6 R_5 R_4 R_3^T R_2^T$$

$$loss_{rear\_right} = R_{front\_main} R_1 R_2 - R_{front\_main} R_6 R_5 R_4 R_3^T$$

$$loss_{front\_left} = R_{front\_main} R_1 R_2 R_3 R_4^T R_5^T - R_{front\_main} R_6$$

$$loss_{rear\_left} = R_{front\_main} R_1 R_2 R_3 R_4^T - R_{front\_main} R_6 R_5$$

The pose graph may also be applied to calibrate one or two cameras if other cameras are well calibrated. For example, if only the rear left and front right needs to be calibrated, the optimization loss can be formulated as:

$$loss_{rear\_left} = R_{front\_left} R_5 - R_{rear\_main} R_4^T$$

$$loss_{front\_right} = R_{front\_main} R_1 - R_{rear\_right} R_2^T$$

Figure 7:
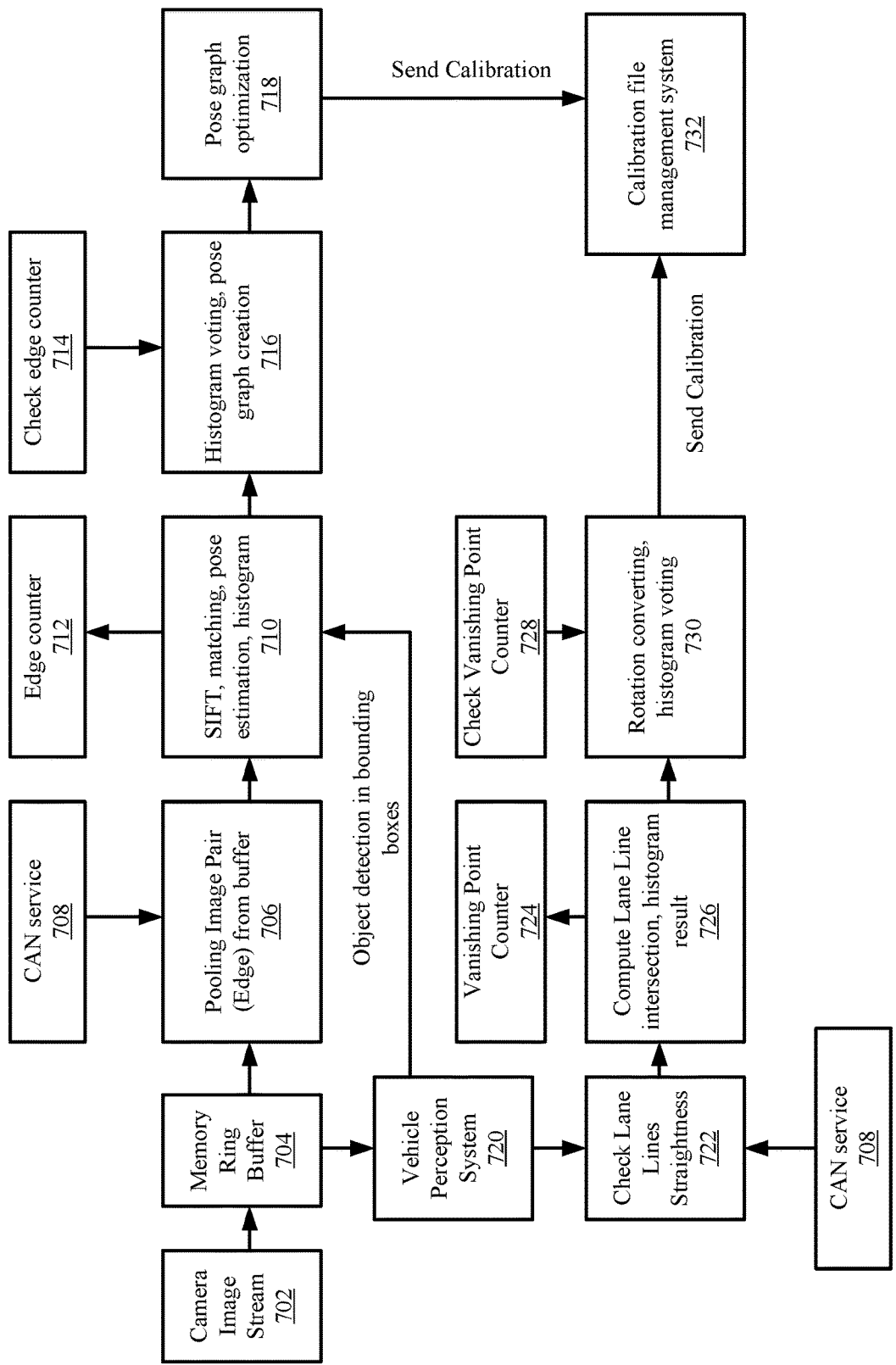
FIG. 7 illustrates a diagram showing another example process for calibrating the multiple cameras in accordance with the disclosure.

FIG. 7 illustrates a diagram showing another example process for calibrating the multiple cameras in accordance with the disclosure.

As depicted, a camera image stream 702 may be fed to one or more memory ring buffers 704 respectively for each camera. The memory ring buffers 704 may temporarily store the camera image stream 702 and feed the camera image stream 702 to a vehicle perception system 720 (alternatively, "visual perception system" as described above). The vehicle perception system 720 may be configured to detect or recognize static objects in the camera image stream 702 including lane lines. The detected static objects may be transmitted to the pose determiner 206, e.g., block 710. To reduce the possibility of later errors, moving objects may be detected but marked with bounding boxes such that the feature points within the bounding boxes will not be considered as input for the feature point matcher 210.

When lane lines are detected in the camera images, the camera calibrator 120 may be configured to check lane lines straightness (block 722) and other signals via CAN service 708. For example, the camera calibrator 120 may be configured to determine whether it is raining based on the signals from the wiper indicator 301, whether the vehicle 101 is turning based on the signals from the angular rate monitor 303, and whether the lane lines are straight based on the output from the lane detector 306 in the visual perception system.

At block 726, the vanishing point determiner 202 of the camera calibrator 120 may be configured to calculate a convergence of the two lane lines and determine the convergence as the vanishing point of the two lane lines. Further, at block 728, when a count of collected vanishing points, e.g., stored by a vanishing point counter 724, is greater than a preset threshold, e.g., $N_H$, a histogram may be created and the peak value of the histogram may be selected as the rotation angle for the final calibration results as indicated by block 730. The calibration results may be sent to a calibration file management system 732 that manages the calibration configuration files of cameras of the example autonomous driving system 100. In some examples, when camera calibrator 120 sends the latest calibrated camera orientations to the file management system 732, the file management system 732 may update the camera configuration files and notify other modules of the autonomous driving system 100.

At block 706, the camera calibrator 120 may similarly check if additional conditions are met based on signals transmitted via CAN service 708. For example, the camera calibrator 120 may be configured to check the signal from a wiper indicator to determine if the wipers are working and if it is raining. The camera calibrator 120 may check the signal from an angular rater monitor to determine if the angular rate is less than one degree per second. The camera calibrator 120 may further check the status of low/high/fog beam and the lux of the environment to determine the environmental light is sufficient.

When the addition conditions are met, the camera calibrator 120 may be configured to identify pairs of images taken by two adjacent cameras from the memory ring buffer 704.

At block 710, the feature detector 208 may be configured to detect the features of surrounding static objects in accordance with some existing algorithm, e.g., a scale-invariant feature transform (SIFT) algorithm. The feature point matcher 210 may be configured to match the feature points in different images captured by the two adjacent cameras and rank the feature points based on the similarities of the feature points.

Similarly, at block 714, the pose calculator 212 may be configured to check an edge counter 712 that stores a count of estimated relative poses. When the count of estimated relative poses exceeds a predetermined threshold, e.g., $N_L$, the pose graph generator 214 may be configured to generate the pose graph. At block 718, the loss calculator 216 may be configured to calculate an optimization loss for each of the side and rear cameras based on the pose graph. The calibration results may also be sent to a calibration file management system 732.

The process and method as depicted in the foregoing drawings may be executed through processing logics including hardware (e.g., circuit, special logic, etc.), firmware, software (e.g., a software embodied in a non-transient computer readable medium), or combination of each two. Although the above describes the process or method in light of certain sequential operation, it should be understood that certain operation described herein may be executed in different orders. Additionally, some operations may be executed concurrently rather than sequentially.

In the above description, each embodiment of the present disclosure is illustrated with reference to certain illustrative embodiments. Any of the above-mentioned components or devices may be implemented by a hardware circuit (e.g., application specific integrated circuit (ASIC)). Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A method for calibrating cameras on an autonomous driving system, comprising:
   receiving a current speed of a moving vehicle from a wheel odometer;
   determining that the current speed of the moving vehicle is greater than a first predetermined speed threshold;
   calibrating, based on the determination that the current speed is greater than the predetermined speed threshold, at least one front camera of the moving vehicle according to a position of a vanishing point of two lane lines,
   wherein prior to the calibrating of the at least one front camera, determining a group of first additional conditions are met, wherein the group of first additional conditions include a wiper indicator showing no rain, an angular rate monitor showing that a current angular rate is less than one degree per second, and that the lane lines are determined to be straight;
   determining that the current speed of the moving vehicle is less than a second predetermined speed threshold and is greater than zero; and
   calibrating, based on the determination that the current speed is less than the predetermined speed threshold and is greater than zero, multiple side and rear cameras of the moving vehicle according to a pose graph that includes relative poses of the multiple side and rear cameras.

2. The method for calibrating cameras on the autonomous driving system of claim 1, further comprising:
   prior to the calibrating of the multiple side and rear cameras, determining a group of second additional conditions are met, wherein the group of second additional conditions include a wiper indicator showing no rain, a light sensor and a beam indicator showing sufficient environmental light, and an angular rate monitor showing that a current angular rate is less than one degree per second.

3. The method for calibrating cameras on the autonomous driving system of claim 1, wherein the at least one front camera includes a front main camera and a front narrow camera both mounted on a top of the moving vehicle.

4. The method for calibrating cameras on the autonomous driving system of claim 1, wherein the calibrating the at least one front camera further includes:
   determining the vanishing point by calculating a convergence of the two lane lines on an image plane; and
   calculating a yaw orientation and a pitch orientation respectively for the at least one front camera based on a difference between the vanishing point and a principal point.

5. The method for calibrating cameras on the autonomous driving system of claim 1, wherein the calibrating the multiple side and rear cameras of the moving vehicle further includes:
  determining the relative poses of the multiple side and rear cameras;
  generating the pose graph that includes the relative poses of the multiple side and rear cameras; and
  calculating an optimization loss for each of the multiple side and rear cameras based on the pose graph.

6. The method for calibrating cameras on the autonomous driving system of claim 5, wherein the determining the relative poses of the multiple side and rear cameras further includes:
  detecting features of objects in images captured by the multiple side and rear cameras;
  matching feature points in the images based on ranked similarities; and
  determining the relative poses based on the matched feature points.

7. The method for calibrating cameras on the autonomous driving system of claim 6, wherein the features of the objects are detected by a scale-invariant feature transform (SIFT) algorithm.

8. The method for calibrating cameras on the autonomous driving system of claim 6, wherein similarities of the feature points in the images are ranked by a k-nearest-neighbor (KNN) algorithm.

9. The method for calibrating cameras on the autonomous driving system of claim 6, wherein the determining of the relative poses further includes calculating an essential matrix of two adjacent cameras and decomposing the essential matrix into a rotation and translation matrix to be one of the relative poses.

10. A system for calibrating cameras on an autonomous driving system, comprising:
  a wheel odometer configured to measure a current speed of a moving vehicle;
  a speed monitor configured to determine that the current speed of the moving vehicle is greater than a first predetermined speed threshold; and
  a camera calibrator configured to calibrate, based on the determination that the current speed is greater than the predetermined speed threshold, at least one front camera of the moving vehicle according to a position of a vanishing point of two lane lines,
  wherein, prior to the calibrating of the at least one front camera, the camera calibrator is further configured to determine no rain based on signals from a wiper indicator, determine that a current angular rate is less than one degree per second based on signals from an angular rate monitor, and determine that the lane lines are straight based on images captured by the at least one front camera,
  wherein the speed monitor is further configured to determine that the current speed of the moving vehicle is less than a second predetermined speed threshold and is greater than zero, and
  wherein the camera calibrator is further configured to calibrate, based on the determination that the current speed is less than the predetermined speed threshold and is greater than zero, multiple side and rear cameras of the moving vehicle according to a pose graph that includes relative poses of the multiple side and rear cameras.

11. The system for calibrating cameras on the autonomous driving system of claim 10, wherein, prior to the calibrating of the multiple side and rear cameras, the camera calibrator is further configured to:
  determine no rain based on signals from a wiper indicator;
  determine environmental light is sufficient based on a light sensor and a beam indicator; and
  determine that a current angular rate is less than one degree per second based on signals from an angular rate monitor.

12. The system for calibrating cameras on the autonomous driving system of claim 10, wherein the at least one front camera includes a front main camera and a front narrow camera both mounted on a top of the moving vehicle.

13. The system for calibrating cameras on the autonomous driving system of claim 10, wherein the camera calibrator includes:
  a vanishing point determiner configured to calculate a convergence of the two lane lines on an image plane; and
  an orientation calculator configured to calculate a yaw orientation and a pitch orientation respectively for the at least one front camera based on a difference between the vanishing point and a principal point.

14. The system for calibrating cameras on the autonomous driving system of claim 10, wherein the camera calibrator includes:
  a pose determiner configured to determine the relative poses of the multiple side and rear cameras;
  a pose graph generator configured to generate the pose graph that includes the relative poses of the multiple side and rear cameras; and
  a loss calculator configured to calculate an optimization loss for each of the multiple side and rear cameras based on the pose graph.

15. The system for calibrating cameras on the autonomous driving system of claim 14, wherein the pose determiner further includes:
  a feature detector configured to detect features of objects in images captured by the multiple side and rear cameras;
  a feature point matcher configured to match feature points in the images based on ranked similarities; and
  a pose calculator configured to determine the relative poses based on the matched feature points.

16. The system for calibrating cameras on the autonomous driving system of claim 15, wherein the feature detector is configured to detect the features of the objects by a scale-invariant feature transform (SIFT) algorithm.

17. The system for calibrating cameras on the autonomous driving system of claim 15, wherein the feature point matcher is further configured to rank similarities of the feature points in the images by a k-nearest-neighbor (KNN) algorithm.

18. The system for calibrating cameras on the autonomous driving system of claim 15, wherein the pose calculator is further configured to calculate an essential matrix of two adjacent cameras and decompose the essential matrix into a rotation and translation matrix to be one of the relative poses.

* * * * *